US012347864B2

(12) United States Patent
Harutyunyan

(10) Patent No.: US 12,347,864 B2
(45) Date of Patent: Jul. 1, 2025

(54) ADDITIVES FOR SELF-STANDING ELECTRODES

(71) Applicant: HONDA MOTOR CO., LTD., Tokyo (JP)

(72) Inventor: Avetik R. Harutyunyan, Santa Clara, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 12 days.

(21) Appl. No.: 17/882,205

(22) Filed: Aug. 5, 2022

(65) Prior Publication Data

US 2024/0047684 A1    Feb. 8, 2024

(51) Int. Cl.

| | |
|---|---|
| *H01M 4/00* | (2006.01) |
| *H01M 4/04* | (2006.01) |
| *H01M 4/1391* | (2010.01) |
| *H01M 4/1393* | (2010.01) |
| *H01M 4/36* | (2006.01) |
| *H01M 4/505* | (2010.01) |
| *H01M 4/525* | (2010.01) |
| *H01M 4/587* | (2010.01) |

(Continued)

(52) U.S. Cl.
CPC ......... *H01M 4/625* (2013.01); *H01M 4/0402* (2013.01); *H01M 4/043* (2013.01); *H01M 4/1391* (2013.01); *H01M 4/1393* (2013.01); *H01M 4/364* (2013.01); *H01M 4/505* (2013.01); *H01M 4/525* (2013.01); *H01M 4/587* (2013.01); *H01M 2004/021* (2013.01)

(58) Field of Classification Search
CPC ...................................................... H01M 4/00
See application file for complete search history.

(56) References Cited

U.S. PATENT DOCUMENTS

| | | |
|---|---|---|
| 8,734,996 B2 | 5/2014 | Feng et al. |
| 9,413,032 B2 | 8/2016 | Wei et al. |

(Continued)

OTHER PUBLICATIONS

Chiwon Kang et al., "Three-dimensional free-standing carbon nanotubes for a flexible lithium-ion battery anode", Nanotechnology 27 (2016) 105402 (8 Pages Total), IOP Publishing, doi:10.1088/0957-4484/27/10/105402.

(Continued)

*Primary Examiner* — Kelly M Gambetta
*Assistant Examiner* — Mohammad Mayy
(74) *Attorney, Agent, or Firm* — ArentFox Schiff LLP; Mark Duell

(57) ABSTRACT

A method of making a self-supportive electrode material that includes providing an aerosolized plurality of carbon nanotubes in a carbon nanotube synthesis reactor, transporting the aerosolized plurality of carbon nanotubes directly from the carbon nanotube synthesis reactor to a mixing chamber, contacting the aerosolized plurality of carbon nanotubes in the mixing chamber with an aerosolized electrode active material from a first chamber to provide a substantially homogenous aerosol mixture of the carbon nanotubes and the electrode active material, and depositing the carbon nanotubes and the electrode active material on a substrate to provide a self-supportive electrode material. Also described are systems for performing the disclosed method and self-supportive electrode materials provided by the method.

16 Claims, 1 Drawing Sheet

(51) Int. Cl.
*H01M 4/62* (2006.01)
*H01M 4/02* (2006.01)

(56) References Cited

U.S. PATENT DOCUMENTS

| | | |
|---|---|---|
| 9,617,158 B2 | 4/2017 | Raychaudhuri et al. |
| 9,780,355 B2 | 10/2017 | Jabbour et al. |
| 9,831,502 B2 | 11/2017 | Zhou et al. |
| 10,003,075 B2 | 6/2018 | Maheshwari et al. |
| 10,312,503 B2 | 6/2019 | Raychaudhuri et al. |
| 10,418,631 B2 | 9/2019 | Beneventi et al. |
| 10,614,966 B2 | 4/2020 | Gangopadhyay et al. |
| 10,658,651 B2 | 5/2020 | Pierce et al. |
| 10,700,347 B2 | 6/2020 | Zhu et al. |
| 10,748,717 B2 | 8/2020 | Bondavalli |
| 10,937,598 B2 | 3/2021 | Yuge |
| 11,018,348 B2 | 5/2021 | Wu et al. |
| 11,056,712 B2 | 7/2021 | Darolles et al. |
| 2013/0056068 A1 | 3/2013 | Ko et al. |
| 2014/0147743 A1 | 5/2014 | Stalder et al. |
| 2016/0082404 A1* | 3/2016 | Pigos ............... B01J 13/0095 252/78.3 |
| 2016/0099471 A1 | 4/2016 | Oh et al. |
| 2016/0137533 A1 | 5/2016 | Na et al. |
| 2016/0338206 A1 | 11/2016 | Yang et al. |
| 2016/0380274 A1 | 12/2016 | Wu et al. |
| 2017/0347460 A1 | 11/2017 | Cao et al. |
| 2019/0036102 A1 | 1/2019 | Pierce et al. |
| 2019/0088925 A1 | 3/2019 | Harutyunyan et al. |
| 2019/0088929 A1 | 3/2019 | Harutyunyan et al. |
| 2019/0267633 A1 | 8/2019 | Lee et al. |
| 2020/0067096 A1 | 2/2020 | Aubert et al. |
| 2020/0083560 A1 | 3/2020 | Harutyunyan et al. |
| 2020/0239317 A1* | 7/2020 | Harutyunyan ...... H01M 4/0402 |
| 2020/0243808 A1 | 7/2020 | Harutyunyan et al. |
| 2020/0259160 A1* | 8/2020 | Pierce .................... B01J 19/00 |
| 2021/0020914 A1* | 1/2021 | Harutyunyan ....... H01M 50/116 |
| 2021/0090820 A1 | 3/2021 | Rajendran et al. |

OTHER PUBLICATIONS

Qinghuiqiang Xiao et al., "Carbon-based flexible self-supporting cathode for lithium-sulfur batteries: Progress and perspective", Carbon Energy, (2021), https://doi.org/10.1002/cey2.96, (32 Pages Total).

Rahul Rao et al., "Graphene as an atomically thin interface for growth of vertically aligned carbon nanotubes", Scientific Reports, 3 : 1891, DOI: 10.1038/srep01891, (6 Pages Total).

Sau Yen Chew et al., "Flexible free-standing carbon nanotube films for model lithium-ion batteries", Elsevier, Carbon 47 (2009), (pp. 2976-2983).

Sheng Zhu et al., "Carbon nanotubes for flexible batteries: recent progress and future perspective", National Science Review, vol. 8, Issue 5, (2021), nwaa261, https://doi.org/10.1093/nsr/nwaa261, (17 Pages Total).

Xing Li et al., "Self-supporting activated carbon/carbon nanotube/ reduced graphene oxide flexible electrode for high performance supercapacitor", Carbon (2018), doi: 10.1016/j.carbon.2017.11.099, (29 Pages Total).

Zhen-Dong Huang et al., "Binder-free graphene/carbon nanotube/ silicon hybrid grid as freestanding anode for high capacity lithium ion batteries", Composites: Part A, (2016), (7 Pages Total), http://dx.doi.org/10.1016/j.compositesa.2016.02.017.

* cited by examiner

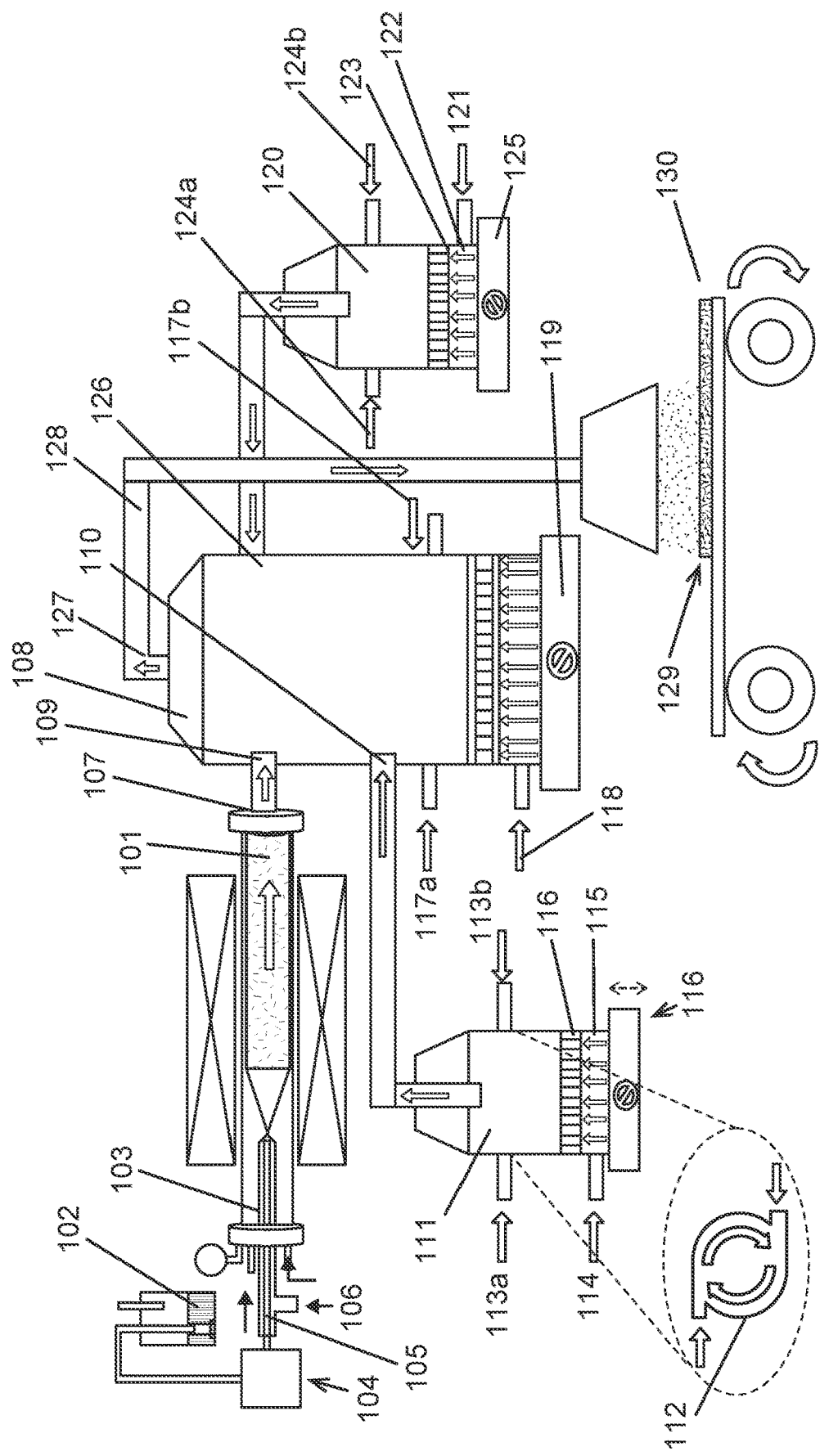

ADDITIVES FOR SELF-STANDING ELECTRODES

TECHNICAL FIELD

The present disclosure is directed to methods and systems for providing of self-supportive electrodes and electrode materials. Also provided are self-supportive electrodes and electrode materials obtainable by the methods and systems described herein.

BACKGROUNDS

Carbon nanotubes have shown increasing promise for use in battery electrodes, particularly in combination with various additives. Generally, electrode materials having carbon nanotubes are prepared by common mixing techniques, which can include synthesizing carbon nanotubes, dispersing the carbon nanotubes in a solvent, functionalizing the carbon nanotubes in order to protect against aggregation, and mixing the carbon nanotubes with binder and an active material in order to provide a slurry.

However, these processes are not only expensive but can also intrinsically degrade the electrode materials, which leads to an inevitable reduction of electrical conductivity in the resulting electrode. Therefore, developing alternative methods for preparing electrode materials having carbon nanotubes is of central importance.

SUMMARY

The present disclosure is directed to a method for producing self-supportive electrodes. The method may include contacting an aerosolized plurality of carbon nanotubes with an aerosolized electrode active material and/or an aerosolized additive to provide a substantially homogenous aerosol mixture having carbon nanotubes, electrode active material, and/or additive. According to some aspects, the aerosolized electrode active material and/or aerosolized additive may be provided by aerosolizing electrode active material and/or additive with one or more carrier gasses provided in a vortex. The carbon nanotubes, electrode active material, and/or additive may then be deposited on a support to provide an electrode material, wherein the electrode material is self-supportive, flexible, binderless, and/or collectorless.

The present disclosure is also directed to systems for producing self-supportive electrodes as described herein. The system may include a carbon nanotube synthesis reactor having an inlet and an outlet, a mixing chamber having at least a first inlet and a second inlet, wherein the first inlet is in communication with the carbon nanotube synthesis reactor and the second inlet is in communication with a first chamber configured to provide a vortex of aerosol.

BRIEF DESCRIPTION OF THE DRAWINGS

FIG. 1 shows an example system according to aspects of the present disclosure.

DETAILED DESCRIPTION

The method of the present disclosure may include synthetizing a plurality of carbon nanotubes in the carbon nanotube synthesis reactor. The carbon nanotube synthesis reactor may be in communication with a carbon source such that the carbon source may be introduced to the a carbon nanotube synthesis reactor in the presence of one or more carrier gases, as known in the art.

For example, FIG. 1 shows a non-limiting example of a carbon nanotube synthesis reactor 101 useful according to the present disclosure. In this example, carbon nanotube synthesis reactor 101 may be in communication with a vessel 102 containing a carbon source. It should be understood that the present disclosure is not particularly limited to a certain carbon source. In some non-limiting examples, the carbon source includes one or more carbon-containing gases, one or more hydrocarbon solvents, or a mixture thereof. Non-limiting examples carbon sources include methane, acetylene, and/or ethylene gases; alcohols, such as ethanol and methanol; benzene; toluene; CO; and $CO_2$.

The carbon nanotube synthesis reactor 101 may have at least a first inlet 103 for receiving a carbon source as described herein. For example, as shown in FIG. 1, carbon nanotube synthesis reactor 101 may include first inlet 103 for receiving a carbon source from vessel 102. The example system as shown in FIG. 1 may further include, for example a pump 104 sufficient to move the carbon source from vessel 102 along a fluid flow path 105 to carbon nanotube synthesis reactor 101. Fluid flow path 105 may optionally include an inlet 106 configured to provide one or more carrier gases. In this way, carbon source exiting vessel 102 may be aerosolized prior to introduction into carbon nanotube synthesis reactor 101.

Example carrier gasses useful according to the present disclosure may include, but are not limited to, argon, hydrogen, nitrogen, and combinations thereof. The carrier gas may be provided to the fluid flow path 105 at any pressure and/or flow rate suitable for providing an aerosolized carbon source to carbon nanotube synthesis reactor 101. For example, the carrier gas may be provided to the fluid flow path 105 at a flow rate of about 300 standard cubic centimeters per minute (sccm), optionally about 400 sccm, optionally about 500 sccm, optionally about 600 sccm, optionally about 700 sccm, optionally about 800 sccm, and optionally about 850 sccm.

Carbon nanotubes may be synthetized in the carbon nanotube synthesis reactor 101 by any means known in the art. In some non-limiting examples, carbon nanotubes may be synthesized in the carbon nanotube synthesis reactor 101 in the presence of a catalyst or catalyst precursor. The catalyst or catalyst precursor may be provided to the carbon nanotube synthesis reactor 101 via a second inlet (not shown in FIG. 1). Additionally or alternatively, the catalyst or catalyst precursor may be provided to the carbon nanotube synthesis reactor 101 via the first inlet 103. For example, vessel 102 as shown in FIG. 1 may contain both the carbon source as described herein and one and/or more catalyst or catalyst precursors as known in the art such that the carbon source and the one or more catalyst and/or catalyst precursors are simultaneously aerosolized and provided to carbon nanotube synthesis reactor 101.

It should be understood that the present disclosure is not particularly limited to a certain catalyst or catalyst precursor for preparing carbon nanotubes. In some non-limiting examples, the catalyst may include a catalyst material supplied as nanoparticles, including colloidal metallic nanoparticles, having a transition metal, a lanthanide metal, or/or an actinide metal. The catalyst may include a Group VI transition metal such as chromium (Cr), molybdenum (Mo), and tungsten (W), and/or a Group VIII transition metal such as iron (Fe), cobalt (Co), nickel (Ni), ruthenium (Ru), rhodium (Rh), palladium (Pd), osmium (Os), Iridium (Ir), and platinum (Pt). According to some aspects, the catalyst may include a combination of two or more metals, for example an iron, nickel, and cobalt mixture or more specifically a 50:50 mixture (by weight) of nickel and cobalt. The catalyst may include a pure metal, a metal oxide, a metal carbide, a nitrate salt of a metal, and/or other compounds containing one or more of the metals described herein. The catalyst particles may include a transition metal, such as a d-block transition metal, an f-block transition metal, or a combination thereof. For example, the catalyst particles may include a d-block transition metal such as iron, nickel, cobalt, gold, silver, or a combination thereof.

Additionally or alternatively, the method may include providing a catalyst precursor to the carbon nanotube synthesis reactor 101, wherein the catalyst precursor can be converted to an active catalyst under the carbon nanotube synthesis reactor's 101 reaction conditions. In some non-limiting examples, the catalyst precursor may include one or more transition metal salts such as a transition metal nitrate, a transition metal acetate, a transition metal citrate, a transition metal chloride, a transition metal fluoride, a transition metal bromide, a transition metal iodide, or hydrates thereof. The catalyst precursor may be a metallocene, a metal acetylacetonate, a metal phthalocyanine, a metal porphyrin, a metal salt, a metalorganic compound, or a combination thereof. The catalyst precursor may be a ferrocene, nickelocene, cobaltocene, molybdenocene, ruthenocene, iron acetylacetonate, nickel acetylacetonate, cobalt acetylacetonate, molybdenum acetylacetonate, ruthenium acetylacetonate, iron phthalocyanine, nickel phthalocyanine, cobalt phthalocyanine, iron porphyrin, nickel porphyrin, cobalt porphyrin, an iron salt, a nickel salt, cobalt salt, molybdenum salt, ruthenium salt, or a combination thereof. The catalyst precursor may include a soluble salt such as $Fe(NO_3)_3$, $Ni(NO_3)_2$ or $Co(NO_3)_2$ dissolved in a liquid such as water. In some examples, the catalyst precursor may achieve an intermediate catalyst state in the carbon nanotube synthesis reactor 101 and subsequently become converted to an active catalyst. For example, the catalyst precursor may be a transition metal salt that is converted into a transition metal oxide in the carbon nanotube synthesis reactor 101, then converted into active catalytic nanoparticles.

According to some aspects, the catalyst and/or catalyst precursor may be supported on a catalyst support, wherein the catalyst support may be selected from alumina, silica, zirconia, magnesia, or zeolites. For example, the catalyst support may be a nanoporous magnesium oxide support. In some examples, the catalyst and/or catalyst precursor may be supported by the catalyst support prior to providing the catalyst and/or catalyst to the carbon nanotube synthesis reactor 101. For example, a solution of a catalyst and/or catalyst as described herein may be combined with a solution of magnesium nitrate, heated together, and then cooled to produce a catalyst on a nanoporous MgO support. Alternately, a silica support may be impregnated with catalyst and/or catalyst precursor and dried for several hours to produce a catalyst and/or catalyst precursor on a porous silica support.

The carbon nanotubes synthesized in the carbon nanotube synthesis reactor 101 of the present disclosure are not particularly limited. For example, the carbon nanotubes may consist of carbon or they may be substituted, i.e., may include non-carbon lattice atoms. Carbon nanotubes may be externally derivatized to include one or more functional moieties at a side and/or an end location. According to some aspects, the carbon nanotubes may include additional components such as metals or metalloids, incorporated into the structure of the nanotube. In certain aspects, the additional components may include a dopant, a surface coating, or a combination thereof.

Carbon nanotubes may be metallic, semimetallic, or semiconducting depending on their chirality. A carbon nanotube's chirality is indicated by the double index (n,m), where n and m are integers that describe the cut and wrapping of hexagonal graphite when formed into a tubular structure, as is well known in the art. A nanotube of an (m,n) configuration is insulating. A nanotube of an (n,n), or "arm-chair", configuration is metallic, and hence highly valued for its electric and thermal conductivity. Carbon nanotubes may have diameters ranging from about 0.6 nm for single-wall carbon nanotubes up to 500 nm or greater for single-wall or multi-wall nanotubes. The carbon nanotubes may range in length from about 50 nm to about 10 cm or greater.

An example carbon nanotube synthesis reactor 101 useful according to the present disclosure is the reactor 101 described in U.S. Patent Publication No. 2019/0036102, the contents of which are expressly incorporated by reference herein in its entirety.

As shown in FIG. 1, carbon nanotube synthesis reactor 101 may include an outlet 107 through which carbon nanotubes synthesized within carbon nanotube synthesis reactor 101 may exit. Outlet 107 may be configured such that carbon nanotubes are transported directly from carbon nanotube synthesis reactor 101 into a mixing chamber 108 via a first aerosol inlet 109 of mixing chamber 108. It should be understood that nanotubes may be provided to mixing chamber 108 as an aerosol having one or more carrier gasses, as described herein.

Mixing chamber 108 may further include a second aerosol inlet 110 in communication with a first chamber 111 configured to aerosolize an electrode active material. As used herein, an "electrode active material" refers to a conductive material in an electrode. The term "electrode" refers to an electrical conductor where ions and electrons are exchanged with an electrolyte and an outer circuit. "Positive electrode" and "cathode" are used synonymously in the present description and refer to the electrode having the higher electrode potential in an electrochemical cell (i.e., higher than the negative electrode). "Negative electrode" and "anode" are used synonymously in the present description and refer to the electrode having the lower electrode potential in an electrochemical cell (i.e., lower than the positive electrode). Cathodic reduction refers to a gain of electron(s) of a chemical species, and anodic oxidation refers to the loss of electron(s) of a chemical species.

The electrode active material of the present disclosure may be any material useful in an electrode of a secondary battery, such as a lithium-ion battery. Non-limiting examples of electrode active materials useful according to the present disclosure include graphite, hard carbon, lithium metal oxides, lithium iron phosphate, metal oxides, and combinations thereof. Non-limiting examples of metal oxides include oxides of alkali metals, alkaline earth metals, transition metals, aluminum, post-transition metals, hydrates thereof, and combinations thereof.

"Alkali metals" are metals in Group I of the periodic table of the elements, such as lithium, sodium, potassium, rubidium, cesium, and francium.

"Alkaline earth metals" are metals in Group II of the periodic table of the elements, such as beryllium, magnesium, calcium, strontium, barium, and radium.

"Transition metals" are metals in the d-block of the periodic table of the elements, including the lanthanide and actinide series. Transition metals include, but are not limited to, scandium, titanium, vanadium, chromium, manganese, iron, cobalt, nickel, copper, zinc, yttrium, zirconium, niobium, molybdenum, technetium, ruthenium, rhodium, palladium, silver, cadmium, lanthanum, cerium, praseodymium, neodymium, promethium, samarium, europium, gadolinium, terbium, dysprosium, holmium, erbium, thulium, ytterbium, lutetium, hafnium, tantalum, tungsten, rhenium, osmium, iridium, platinum, gold, mercury, actinium, thorium, protactinium, uranium, neptunium, plutonium, americium, curium, berkelium, californium, einsteinium, fermium, mendelevium, nobelium, and lawrencium.

"Post-transition metals" include, but are not limited to, aluminum, gallium, indium, tin, thallium, lead, bismuth, and polonium.

According to some aspects, the electrode active material may be provided as a powder. As used herein, the term "powder" refers to fine, dry particles. In one non-limiting example, the electrode active material powder may include fine, dry particles having an average particle size of between about 1 nanometer and 100 microns.

First chamber 111 may be configured to aerosolize the electrode active material with one or more carrier gasses as described herein. For example, first chamber 111 may include an inlet 114 configured to provide a flow of carrier gas sequentially through a porous frit 115 and a bed 116 of electrode active material in order to provide an aerosol entering first chamber 111 in a first direction. In some non-limiting examples, inlet 114 may provide a flow of carrier gas having an approximate flow rate of between about 1000 and 2000 sccm, and optionally about 1500 sccm. It should be understood that the flow rate of carrier gas may be constant or it may be varied during operation of the system as described herein.

According to some aspects, the aerosol in first chamber 111 may include a substantially homogenous concentration of electrode active material. As used here, in the term "homogenous" is defined as "consistent throughout."

According to some aspects, the substantially homogenous concentration of electrode active material in first chamber 111 may be achieved at least in part by providing a shaker 116 sufficient to agitate the bed 116 of electrode active material. According to some aspects, shaker 116 may provide agitation to bed 116 in the first direction, that is, the direction in which the aerosol having the electrode active material enters first chamber 111. It should be understood that the shaker may provide movement to bed 116 independently or to the entire first chamber 111. In some non-limiting examples, the first direction may be a substantially vertical direction, as shown in FIG. 1.

Additionally or alternatively, the substantially homogenous concentration may be achieved at least in part by a providing a vortex of aerosol in first chamber 111. As used herein, the term "vortex" refers a body of fluid, such as a gas and/or an aerosol, having an angular velocity. As shown in FIG. 1, a vortex 112 in first chamber 111 may be obtained by providing one or more tangential flows of carrier gas via one or more tangential inlets 113a, 113b The one or more tangential flows of carrier gas may have a flow direction that is different from the first direction of aerosol entering first chamber 111, such as a direction that is substantially tangential to the first direction. In some non-limiting one or more tangential inlets 113a, 113b may provide a flow of carrier gas having an approximate combined flow rate of between about 1000 and 2000 sccm, and optionally about 1500 sccm. It should be understood that the flow rate of carrier gas may be constant or it may be varied during operation of the system as described herein.

It should be understood that the carrier gas entering first chamber 111 via one or more tangential inlets 113a, 113b may independently be the same as the carrier gas provided via inlet 114 or different therefrom. It should also be understood that the arrangement of one or more tangential inlets 113a, 113b as shown in FIG. 1 is not necessarily limiting. For example, although not shown, first chamber 111 may include three, four, or more tangential inlets in order to provide three, four, or more tangential flows of carrier gas.

As described herein, the method may include contacting the aerosolized carbon nanotubes from carbon nanotube synthesis reactor 101 with aerosolized electrode active material from first chamber 111 in mixing chamber 108 in order to provide a substantially homogenous aerosol mixture having the carbon nanotubes and electrode active material. According to some aspects, the substantially homogenous aerosol mixture in chamber 108 may be achieved at least in part by a providing a vortex of aerosol in chamber 108 as described herein.

For example, chamber 108 may include a first carrier gas inlet 118 configured to provide a first flow of carrier gas to chamber 108 in a first direction. It should be understood that the carrier gas provided by first carrier gas inlet 118 may be the same as or different from the carrier gas encompassed by the aerosolized carbon nanotubes from carbon nanotube synthesis reactor 101 and/or the aerosolized electrode active material from first chamber 111.

Chamber 108 may further include one or more tangential inlets 117a, 117b configured to provide one or more tangential flows of carrier gas as described herein, wherein the one or more tangential flows of carrier gas have a direction that is tangential to the first direction. Again, it should be understood that the carrier gas provided by the one or more tangential inlets 117a, 117b may independently be the same as or different from the carrier gas encompassed by the aerosolized carbon nanotubes from carbon nanotube synthesis reactor 101 and/or the aerosolized electrode active material from first chamber 111.

Additionally or alternatively, mixing chamber 108 may be in communication with a shaker 119 configured to provide agitation to the aerosol contained in mixing chamber 108. In some non-limiting examples, shaker 119 may be configured to provide movement to chamber 108 in a substantially vertical direction, as shown in FIG. 1.

The method may further include contacting the aerosolized carbon nanotubes from carbon nanotube synthesis reactor 101 with an aerosolized additive. As used herein, an "additive" refers to a matrix component of a self-supportive, flexible, binderless, and/or collectorless electrode as described herein. In some non-limiting examples, the additive may include graphene flakes, carbon black, activated carbon, other carbon allotropes, or a combination thereof.

According to some aspects, the additive may be provided as an aerosolized powder as described herein. For example, an additive powder may be provided with the bed 116 of electrode active material powder such that the additive powder and electrode active material powder are concurrently aerosolized in first chamber 111 as described herein. In this example, first chamber 111 may include an aerosol having a substantially homogenous concentration of additive and electrode active material, which may be contacted with the aerosolized carbon nanotubes from carbon nanotube synthesis reactor 101 in mixing chamber 108 as described herein.

Additionally or alternatively, the additive may be aerosolized in a second chamber 120 as shown in FIG. 1. In this example, mixing chamber 108 may include a third aerosol inlet 126 configured to provide aerosolized additive powder from second chamber 120 to mixing chamber 108, similar to first chamber 111.

Second chamber 120 may be configured to substantially mirror first chamber 111. In particular, second chamber 120 may include a first inlet 121 configured to provide a carrier gas through a porous frit 122 and a bed 123 of additive powder, similar to the corresponding components of first chamber 111 as described herein. In addition, similar to first chamber 111, second chamber 120 may include one or more tangential inlets 124*a*, 142*b* sufficient to provide a vortex in second chamber 120 as described in relation to first chamber 111. Additionally or alternatively, second chamber 120 may include a shaker configured to agitate the bed 124 of additive powder as described in relation to first chamber 111.

In some non-limiting examples, first inlet 121 and one or more tangential inlets 124*a*, 124*b* may provide a flow of carrier gas at about the same flow rate as the corresponding inlets 114, 113*a*, and 113*b* in first chamber 111. Alternatively, first inlet 121 may provide a flow of carrier gas having an approximate flow rate of between about 500 and 1500 sccm, and optionally about 1000 sccm. It should be understood that the flow rate of carrier gas may be constant or it may be varied during operation of the system as described herein.

Additionally or alternatively, one or more tangential inlets 124*a*, 142*b* may provide a flow of carrier gas having an approximate combined flow rate of between about 500 and 1500 sccm, and optionally about 1000 sccm. It should be understood that the flow rate of carrier gas may be constant or it may be varied during operation of the system as described herein.

According to some aspects, the system may be configured such that aerosols enter mixing chamber 108 at a combined flow rate of between about 1000 and 10000 sccm, optionally between about 2500 and 7500 sccm, and optionally about 5000 sccm under one atm of pressure.

The aerosol in mixing chamber 108 may be a substantially homogenous aerosol mixture having carbon nanotubes, electrode active material, and/or additive as described herein. The method according to the present disclosure may further include depositing the carbon nanotubes, electrode active material, and/or additive from mixing chamber 108 on a substrate to provide an electrode material. The carbon nanotubes, electrode active material, and/or additive may be deposited on the substrate by any means suitable for use with the present disclosure as known in the art.

For example, as shown in FIG. 1, mixing chamber 108 may include an outlet 127 through which the substantially homogenous aerosol mixture may exist. The substantially homogenous aerosol mixture may travel along a fluid path 128 toward a substrate 129.

In some non-limiting examples, substrate 129 may be include a porous surface, including but not limited to a filter or a frit, where the pores are configured to retain the mixture of carbon nanotubes, electrode active material, and/or additive thereon while allowing passage of carrier gas or gasses therethrough. Optionally, the carrier gas or gasses may be removed from the system, for example, using a vacuum source.

The porous surface encompassed by the substrate 129 is not particularly limited. For example, the porous substrate 129 may include woven and/or non-woven fabrics. Non-limiting examples of porous substrate materials include cotton, polyolefins, nylons, acrylics, polyesters, fiberglass, and polytetrafluoroethylene (PTFE). To the extent the substrate 129 may be sensitive to high temperatures, the aerosol traveling along fluid path 128 may be precooled with dilution gases having a lower temperature and/or by directing fluid path 128 through a heat exchanger.

According to some aspects, the substrate 129 may include a movable substrate. The substrate 129 may be rendered movable by any suitable means known to those of ordinary skill in the art. In some non-limiting examples, the movable substrate 129 may include a porous flexible substrate attached to a conveyor belt or a roll-to-roll system, such as roll-to-roll system 130 as shown in FIG. 1. The rate of motion of the movable substrate may be controllable, such as by a computer or manually. Control of the rate of motion may enable or facilitate control of the thickness of the resulting electrode material.

Additionally or alternatively, the thickness of the resulting electrode material may at least partially be controlled by the flow rate of aerosol directed from mixing chamber 108 to substrate 129 as described herein. It should be understood that the flow rate of aerosol from mixing chamber 108 may at least partially be a function of the flow rate of aerosol directed into mixing chamber 108. For example, in some non-limiting aspects, the flow rate of carrier gas into mixing chamber 108 via first carrier gas inlet 118 may be between about 0.5 to 2.5 L/min, optionally between about 0.1 and 1.5 L/min, optionally about 1.5 L/min, and optionally about 1 L/min. Additionally or alternatively, the combined flow rate of aerosol entering mixing chamber 108 via first aerosol inlet 109, second aerosol inlet 110, and/or third aerosol inlet 126 may be between about 0.5 to 2.5 L/min, optionally between about 0.1 and 1.5 L/min, optionally about 1.5 L/min, and optionally about 1 L/min. It should be understood that the flow rate of aerosol entering mixing chamber 108 via first aerosol inlet 109, second aerosol inlet 110, and/or third aerosol inlet 126 may independently be constant or varied throughout operation of the system as described herein. In the case wherein the flow rate(s) are varied, the average combined flow rate of aerosol entering mixing chamber 108 via first aerosol inlet 109, second aerosol inlet 110, and/or third aerosol inlet 126 may be between about 0.5 and 2.5 L/min, optionally between about optionally about between about 0.1 and 1.5 L/min, optionally about 1.5 L/min, and optionally about 1 L/min The method may optionally include removing the electrode material from the substrate 129 by any suitable means known in the art in order to provide an electrode. The method may also optionally include treating the electrode material and/or electrode, including but not limited to pressing and/or cutting the electrode material and/or electrode, as known in the art.

According to some aspects, the electrode material and/or electrode may be pressed to a certain thickness in order to provide a certain electrode density. It should be understood that the density of the electrode material and/or electrode will be a function of the weight of the electrode material (e.g., the carbon nanotubes, electrode active material, and/or additive) and the thickness of the electrode material and/or electrode. In some non-limiting examples, the electrode material and/or electrode may be pressed to have a density of between about 0.1 and 3 g/cm$^3$, optionally between about 2.3 and 2.5 g/cm$^3$, optionally between about 1.5 and 2 g/cm$^3$, optionally between about 1.2 and 1.3 g/cm$^3$, and optionally between about 0.7 and 1 g/cm$^3$. It should be understood that in some non-limiting examples, the electrode density may be selected to provide certain electrode properties. Merely as an example, the certain density may be between about 1.5 and 2 g/cm$^3$ for high-flexibility cathodes, between about 2.3 and 2.5 g/cm³ for high-energy density cathodes, between about 0.7 and 1 g/cm³ for flexible anodes, and between about 1.2 and 1.3 g/cm³ for high-energy density anodes.

The electrode material and/or electrode of the present disclosure may be self-supportive. As used herein, "self-supportive" refers to a material having a strength that is sufficient to support its own mass without requiring support. According to some aspects, the electrode material and/or electrode is optionally free of binder and/or optionally free of a metal-based current collector (e.g., alumina or copper).

The electrode material and/or electrode of the present disclosure may have a certain ratio of components sufficient to provide acceptable solid electrolyte interface (SEI) properties. It should be understood that the method according to the present disclosure allows for a selection of a certain ratios of carbon nanotubes, electrode active material, and/or additive by adjusting the flow rate, flow time, and/or concentration of carbon nanotubes, electrode active material, and/or additive entering the mixing chamber 108, thus adjusting the concentration of carbon nanotubes, electrode active material, and/or additive in the homogeneous aerosol mixture as described herein. In some examples, by selecting a certain ratio of carbon nanotube to additive in the electrode active material, certain surface properties of the resulting electrode may be selected.

According to some aspects, the method may include adjusting the composition and flow rate of aerosols as described herein such that the concentration of carbon nanotubes in the resulting electrode is between about 0.01 and 10% w/w of the concentration of electrode active material, optionally between about 0.01 and 5% w/w of the concentration of electrode active material, optionally between about 0.01 and 2% w/w of the concentration of electrode active material, and optionally about 1% w/w of the concentration of electrode active material.

The present disclosure is also directed to systems for producing self-supportive electrodes as described herein. The system may include a carbon nanotube synthesis reactor 101 having a first inlet 103 and an outlet 107, a mixing chamber 108 having at least a first aerosol inlet 109 and a second aerosol inlet 110, wherein the first aerosol inlet 109 is in communication with the carbon nanotube synthesis reactor 101 and the second aerosol inlet 110 is in communication with a first chamber 111 configured to provide a vortex 112 of aerosol as described herein. The system may optionally include a second chamber 120 configured to provide a vortex 112 aerosol, the second chamber 120 being in communication with the mixing chamber 108 via a third aerosol inlet 126 therein. According to some aspects, the first chamber 111 and/or the second chamber 120 may be configured to provide a substantially homogenous aerosol of electrode active material and/or additive as described herein. For example, the first chamber 111 and/or the second chamber 120 may independently include at least a shaker and/or one, two, or more tangential inlets 113a, 113b, 124a, 124b as described herein. The system may further include an outlet 127 in the mixing chamber 108 such that the system is configured to deposit carbon nanotubes, electrode active material, and/or additive from the mixing chamber 108 onto a support as described herein.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Thus, the claims are not intended to be limited to the aspects shown herein, but are to be accorded the full scope consistent with the language of the claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Further, the word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. Nothing disclosed herein is intended to be dedicated to the public regardless of whether such disclosure is explicitly recited in the claims.

Moreover, all references throughout this application, for example patent documents including issued or granted patents or equivalents; patent application publications; and non-patent literature documents or other source material; are hereby incorporated by reference herein in their entireties, as though individually incorporated by reference.

The following examples are put forth so as to provide those of ordinary skill in the art with a complete disclosure and description of how to make and use the present invention, and are not intended to limit the scope of what the inventors regard as their invention nor are they intended to represent that the experiments described below are all or the only experiments performed. Efforts have been made to ensure accuracy with respect to numbers used (e.g. amounts, dimensions, etc.) but some experimental errors and deviations should be accounted for.

EXAMPLES

Example I: Preparation of NMC Electrode

First, a precursor solution was prepared by dissolving ferrocene in xylene at a concentration of 10 wt. % using mild sonication. Then, 60 mL of the precursor solution was loaded into a syringe and injected into a carbon nanotube synthesis reactor (i.e., a quartz tube furnace) via a capillary connected to a syringe pump. The capillary was placed such that its exit point was just outside the hot zone of the tube furnace. The carbon nanotube synthesis reactor was also directly attached to a mixing chamber via a first inlet. The mixing chamber further included a second inlet, the second inlet being in communication with a chamber containing a vortex of 50 g of aerosolized lithium nickel manganese cobalt oxide (NMC). The first and second inlets were tangential to a carrier gas inlet at the bottom of the mixing chamber. In this way, the mixing chamber was configured to provide a substantially homogenous aerosol vortex therein. The mixing chamber further included an outlet configured to deposit carbon nanotubes and NMC from the substantially homogenous aerosol onto a porous frit.

To perform the method, the precursor solution was injected into the carbon nanotube reactor at a rate of 6 mL/h for 10 hours. Simultaneously, aerosolized carbon nanotubes from the reactor and aerosolized NMC from the first chamber were continuously injected into the mixing chamber at a combined flow rate of 1.5 L/min. At the same time, a carrier gas was continuously injected into the mixing chamber via the first carrier gas inlet at a flow rate of 1.5 L/min in order to provide a vortex of a substantially homogenous aerosol containing carbon nanotubes and NMC.

This homogenous aerosol was continuously directed through an outlet in the mixing chamber to a porous frit having a diameter of about 5 inches, whereon the carbon nanotubes and NMC were collected to provide an electrode material. After the 10-hour run time, an electrode material having approximately 70-75 mg of carbon nanotubes and 7-8 g of NMC had been collected on the frit. The electrode material was then pressed to a thickness of approximately 263.1 μm such that the final density of carbon nanotubes and NMC was 2.4 g/cm$^3$.

Example II: Preparation of Graphite Anode

First, a precursor solution was prepared by dissolving ferrocene in xylene at a concentration of 10 wt. % using mild sonication. Then, 60 mL of the precursor solution was loaded into a syringe and injected into a carbon nanotube synthesis reactor (i.e., a quartz tube furnace) via a capillary connected to a syringe pump. The capillary was placed such that its exit point was just outside the hot zone of the tube furnace. The carbon nanotube synthesis reactor was also directly attached to a mixing chamber via a first inlet. The mixing chamber further included a second inlet, the second inlet being in communication with a chamber containing a vortex of 50 g of graphite powder. The first and second inlets were tangential to a carrier gas inlet at the bottom of the mixing chamber. In this way, the mixing chamber was configured to provide a substantially homogenous aerosol vortex therein. The mixing chamber further included an outlet configured to deposit carbon nanotubes and graphite from the substantially homogenous aerosol onto a porous frit.

To perform the method, the precursor solution was injected into the carbon nanotube reactor at a rate of 6 mL/h for 10 hours. Simultaneously, aerosolized carbon nanotubes from the reactor and aerosolized graphite from the first chamber were continuously injected into the mixing chamber at a combined flow rate of 1 L/min. At the same time, a carrier gas was continuously injected into the mixing chamber via the first carrier gas inlet at a flow rate of 1 L/min in order to provide a vortex of a substantially homogenous aerosol containing carbon nanotubes and graphite.

The homogenous aerosol was then directed through an outlet in the mixing chamber to a porous frit having a diameter of about 5 inches, whereon the carbon nanotubes and graphite were collected to provide an electrode material. After the 10-hour run time, approximately 70-75 mg of carbon nanotubes and 7-8 g of graphite had been collected on the frit.

What is claimed is:

1. A method of making a self-supportive electrode material, the method comprising:
providing an aerosolized plurality of carbon nanotubes in a carbon nanotube synthesis reactor;
transporting the aerosolized plurality of carbon nanotubes directly from the carbon nanotube synthesis reactor to a mixing chamber;
providing an aerosol mixture by contacting the aerosolized plurality of carbon nanotubes in the mixing chamber with an aerosolized electrode active material from a first chamber and an aerosolized additive from a second chamber;
creating a vortex of the aerosol mixture in the mixing chamber to provide a substantially homogenous aerosol mixture comprising the carbon nanotubes, the electrode active material, and the additive; and
depositing the carbon nanotubes, the electrode active material, and the additive directly on a porous substrate to provide a self-supportive electrode material.

2. The method of claim 1, wherein the aerosolized electrode active material is provided in a vortex in the first chamber.

3. The method of claim 2, wherein the first chamber comprises an inlet configured to provide a flow of carrier gas sequentially through a porous frit and a bed of the electrode active material in a first direction.

4. The method of claim 3, wherein the first chamber further comprises one or more tangential inlets configured to provide one or more tangential flows of carrier gas in a direction that is tangential to the first direction.

5. The method of claim 3, wherein the first chamber comprises a shaker configured to agitate the bed of the electrode active material in the first direction.

6. The method of claim 1, wherein the aerosolized additive is provided in a vortex in the second chamber.

7. The method of claim 6, wherein the second chamber comprise an inlet configured to provide a flow of carrier gas sequentially through a porous frit and a bed of the additive in a first direction.

8. The method of claim 7, wherein the second chamber further comprises one or more tangential inlets configured to provide one or more tangential flows of carrier gas in a direction that is tangential to the first direction.

9. The method of claim 1, wherein the electrode active material comprises a lithium metal oxide, a lithium iron phosphate, or a combination thereof.

10. The method of claim 1, wherein the electrode active material comprises graphite.

11. The method of claim 1, wherein the porous substrate is movable.

12. The method of claim 1, wherein the self-supportive electrode material comprises the carbon nanotubes at a concentration of between about 0.01 and 10% w/w of a concentration of the electrode active material.

13. The method according to claim 12, wherein the self-supportive electrode material comprises the carbon nanotubes at a concentration of about 1% w/w of the concentration of the electrode active material.

14. The method according to claim 1, wherein the aerosolized plurality of carbon nanotubes and the aerosolized electrode active material are provided to the mixing chamber at a combined flow rate of between about 0.5 to 2.5 L/min.

15. The method of claim 1, wherein the additive comprises graphene flakes.

16. The method of claim 1, further comprising pressing the self-supportive electrode active material to a density of between about 0.1 and 3 g/cm$^3$.

* * * * *